United States Patent [19]

Roberts et al.

[11] 4,370,435

[45] Jan. 25, 1983

[54] ASPHALT BASED COATINGS

[75] Inventors: Michael G. Roberts; Joseph F. Tanner, both of Newark, Ohio

[73] Assignee: Owens-Corning Fiberglas Corporation, Toledo, Ohio

[21] Appl. No.: 314,829

[22] Filed: Oct. 26, 1981

[51] Int. Cl.³ ............................................. C08K 5/10
[52] U.S. Cl. .................................. 524/312; 524/476; 524/572; 525/54.5
[58] Field of Search .................... 524/572, 312, 476; 525/54.5, 62

[56] References Cited

U.S. PATENT DOCUMENTS 4,273,685  6/1981  Marzocchi et al. ................ 428/392

Primary Examiner—Melvyn I. Marquis
Attorney, Agent, or Firm—Ronald C. Hudgens; Robert F. Rywalski; Philip R. Cloutier

[57] ABSTRACT

Combination of solvent solutions of chemically modified asphalts and oil based paints compatible therewith are disclosed as coating materials.

10 Claims, No Drawings

ASPHALT BASED COATINGS

TECHNICAL FIELD

This invention relates to asphalt-based coatings.

In one of its more specific aspects, this invention relates to novel coatings based on blends of chemically modified asphalt and oil based paints.

BACKGROUND OF THE INVENTION

Rubber modified asphalt compositions as defined in U.S. Pat. No. 4,273,685 to Marzocchi et al., the disclosure of which is incorporated herein by reference, are a recent invention. Succinctly, these compositions comprise a chemically-modified asphalt which has been reacted with a polymerizable vinyl aromatic monomer and a rubbery polymer, the reaction having been carried out at a temperature at which the vinyl aromatic monomer and the rubbery polymer react with the asphalt. The rubbery polymer can be selected from the group consisting of homo-polymers of a conjugated dienes and copolymers formed of a conjugated diene and at least one ethylenic monomer copolymerizable therewith.

The ethylenic monomer is selected from the group consisting of styrene, acrylonitrile, methacrylonitrile, acrylic acid, methacrylic acid, hydroystrene, aminostryene mercaptostyrene, and vinyl toluene.

Relatedly, there have recently been developed solvent solutions of these chemically modified asphalts. Two types of these have been developed.

The first of these is a homogenous, stable solution of the reaction product of asphalt, a vinyl aromatic monomer, and a rubbery polymer in an organic solvent, the solvent being selected from the group consisting of (a) toluene, (b) a mixture of toluene and xylene having a minimum of about 25 percent by weight toluene and a maximum of about 75 percent by weight xylene, (c) a mixture of toluene and Stoddard solvent having a minimum of about 40 percent toluene and a maximum of about 60 percent Stoddard solvent, (d) a mixture of toluene, xylene and at least one compound selected from the group consisting of heptane and hexane, the mixture having a minimum of about 25 percent toluene, a maximum of about 55 percent xylene and a maximum of about 20 percent of heptane or hexane or a mixture thereof, (e) a mixture of toluene, Stoddard solvent and heptane or hexane, or a mixture of heptane or hexane, the maximum amount of heptane or hexane, or a mixture thereof, being about 25 percent, the minimum amount of toluene being about 40 percent and the maximum amount of Stoddard solvent being about 55 percent, all percentages being weight percent and (f) a mixture of from about 40 to about 90 percent toluene and from about 10 to about 60 percent hexane or heptane.

All solutions are simply prepared by combining the chemically modified asphalt and the above defined solvents with agitation being applied for a sufficient period of time to form a homogenous solution.

The second of the solvent solutions of the chemically modified asphalts comprises a homogenous, stable organic solvent solution of the reaction product of asphalt, a polymerizable vinyl aromatic monomer, and a rubbery polymer, the solvent being selected from the group consisting of (a) a mixture consisting essentially of about 40 to about 80 weight percent xylene and about 20 to about 60 weight percent Stoddard solvent and (b) a mixture consisting essentially of xylene, Stoddard solvent and hexane or heptane, or a mixture of hexane and heptane, with xylene being present in an amount of about 40 to about 80 weight percent, the Stoddard solvent being present in an amount of about 5 to about 35 weight percent, the hexane or heptane, or mixture thereof, being present in a maximum amount of about 25 weight percent.

SUMMARY OF THE INVENTION

There has now been discovered a further use for the solvent solutions of these chemically modified asphalts.

According to the present invention, there is provided a composition of a solvent solution of a chemically modified asphalt and an oil based paint, the solvent solution of the chemically modified asphalt and the vehicle of the paint being compatible, that is, miscible in the absence of the formation of phase separation.

By paint is meant any uniformly dispersed mixture having a viscosity ranging from a thin liquid to a semi-solid paste and consisting of (1) a drying oil, synthetic resin, or other film-forming component called the binder; (2) a solvent; and (3) an organic or inorganic pigment. The binder and the solvent are collectively called the vehicle. Also included under the definition of paint are aluminum paints and aluminum pastes in a semi-solid state.

DETAILED DESCRIPTION OF THE INVENTION

The solvent solution, or solutions, of the chemically modified asphalts are combined with the paint in any suitable ratio, that is, either material in any percentage between about 1 and about 99 volume percent. A preferred percentage range is from about 5 to about 75 volume percent of the solvent solution of the chemically modified asphalt and from about 95 to about 25 volume percent of the paint.

The combination of the paint and the solvent solution of the chemically modified asphalt can be made in any suitable manner, including mixing at room temperatures.

The combination of the solvent solutions of the chemically modified asphalt and the paint can be applied to any suitable surface including wood, masonry, metal, rubber and the like. Application can be by brush, roller or spray, or any other conventional coating application method.

Included in the combination of the solvent solution of the chemically modified asphalt and the paint can be fillers, pigments, sand, glass fibers, glass flakes, and the like.

The coatings of this invention possess good adhesion, flexibility, low permeability and color.

It will be evident from the foregoing that various modifications can be made to this invention. Such, however, are considered within the scope of the invention.

We claim:

1. A composition comprising a solvent solution of a chemically modified asphalt and an oil based paint, the solvent solution and the vehicle of the paint being compatible.

2. The composition of claim 1 in which said solvent solution comprises the reaction product of asphalt, a vinyl aromatic monomer and a rubbery polymer in an organic solvent.

3. The composition of claim 2 in which said solvent is selected from the group consisting of (a) toluene and (b) a mixture of toluene and xylene having a minimum of about 25 percent by weight toluene and a maximum of about 75 percent by weight xylene.

4. The composition of claim 2 in which said solvent is selected from the group consisting of (a) a mixture of toluene and Stoddard solvent having a minimum of about 40 percent by weight toluene and a maximum of about 60 percent by weight Stoddard solvent, (b) a mixture of toluene, xylene and at least one compound selected from the group consisting of heptane and hexane, the mixture having a minimum of about 25 weight percent toluene, a maximum of about 55 weight percent xylene and a maximum of about 20 weight percent heptane or hexane or a mixture thereof, (c) a mixture of toluene, Stoddard solvent and heptane or hexane, or a mixture of heptane or hexane, the maximum amount of heptane or hexane, or a mixture thereof, being about 25 weight percent, the minimum amount of toluene being about 40 weight percent and the maximum amount of Stoddard solvent being about 55 weight percent, and (d) a mixture of from about 40 to about 90 percent toluene and from about 10 to about 60 percent hexane or heptane.

5. The composition of claim 2 in which said solvent is selected from the group consisting of (a) a mixture consisting essentially of about 40 to about 80 weight percent xylene and about 20 to about 60 weight percent Stoddard solvent and (b) a mixture consisting essentially of xylene, Stoddard solvent and hexane or heptane, with xylene being present in an amount of about 40 to about 80 weight percent, the Stoddard solvent being present in an amount of about 5 to about 35 weight percent, the hexane and heptane, or mixture thereof, being present in a maximum amount of about 25 weight percent.

6. The composition of claim 1 in which said solvent solution of a chemically modified asphalt is present in an amount within the range of from about 1 to about 99 volume percent and said oil based paint is present in an amount within the range of from about 99 to about 1 volume percent.

7. The composition of claim 1 in which said solvent solution of a chemically modified asphalt is present in an amount within the range of from about 5 to about 75 volume percent and said oil based paint is present in an amount within the range of from about 95 to about 25 volume percent of said composition.

8. The composition of claim 1 in which said paint comprises a binder, a solvent vehicle and an organic or inorganic pigment.

9. The composition of claim 1 in which said solvent solution is present in an amount within the range of from about 5 to about 75 volume percent and said paint is present in an amount within the range of from about 95 to about 25 volume of said composition.

10. The composition of claim 1 comprising glass fibers or glass flakes.

* * * * *